United States Patent
Byreddy et al.

(10) Patent No.: US 9,529,639 B2
(45) Date of Patent: Dec. 27, 2016

(54) SYSTEM AND METHOD FOR STAGING IN A CLOUD ENVIRONMENT

(71) Applicant: Software AG, Darmstadt (DE)

(72) Inventors: Bhaskar Reddy Byreddy, Bangalore (IN); Piotr Walicki, Leipzig (DE); Dobromir Karamelski, Frankfurt (DE); Udo Hafermann, Darmstadt (DE); Preetha Srinivasan, Bangalore (IN)

(73) Assignee: Software AG, Darmstadt (DE)

( * ) Notice: Subject to any disclaimer, the term of this patent is extended or adjusted under 35 U.S.C. 154(b) by 100 days.

(21) Appl. No.: 14/446,731

(22) Filed: Jul. 30, 2014

(65) Prior Publication Data

US 2016/0034318 A1    Feb. 4, 2016

(51) Int. Cl.
*G06F 9/44*   (2006.01)
*G06F 9/445*  (2006.01)
*G06F 9/50*   (2006.01)
*G06F 9/48*   (2006.01)

(52) U.S. Cl.
CPC ........... *G06F 9/5083* (2013.01); *G06F 9/4881* (2013.01)

(58) Field of Classification Search
CPC .............. G06F 9/45558; G06F 2009/4557; G06F 9/45533; G06F 9/5027; G06F 9/5038; G06F 9/505; G06F 9/5066
See application file for complete search history.

(56) References Cited

U.S. PATENT DOCUMENTS

| 8,522,195 B2* | 8/2013 | Miloslavshy et al. .... G06F 9/44 717/104 |
| 8,635,531 B2* | 1/2014 | Kimmet ................ G06F 15/177 715/735 |
| 2009/0077531 A1* | 3/2009 | Miloslavsky ............. G06F 8/10 717/100 |
| 2009/0271760 A1* | 10/2009 | Ellinger .................... G06F 8/20 717/101 |

(Continued)

OTHER PUBLICATIONS

Upendra Sharma et al.; A Cost-aware Elasticity Provisioning System for the Cloud; 2011 IEEE; pp. 559-870; <http://ieeexplore.ieee.org/stamp/stamp.jsp?tp=&arnumber=5961733>.*

(Continued)

*Primary Examiner* — Thuy Dao
*Assistant Examiner* — Cuong V Luu
(74) *Attorney, Agent, or Firm* — Posz Law Group, PLC

(57) ABSTRACT

A method and system for staging in a cloud environment defines a default stage for integration flows. An integration flow is defined by (a) stages including (i) a live stage to follow the default stage, (ii) additional stages between the default and live stages, and (b) endpoint definitions for the live and additional stages. In response to an instruction to promote the integration flow, the integration flow is load balanced by allocating each stage to execution environment(s). Then, the integration flow is run in the execution environment(s). The load balancing includes, for each stage, (i) retrieving a list of execution environments which are available for execution of stages, (ii) selecting execution environment(s) on which to execute the stage and updating the list of available execution environments to indicate that the selected execution environment(s) is allocated, and (iii) storing the selected execution environment(s) as specific to the stage.

20 Claims, 10 Drawing Sheets

(56) References Cited

U.S. PATENT DOCUMENTS

| | | | |
|---|---|---|---|
| 2011/0055399 A1* | 3/2011 | Tung | G06F 9/5072 709/226 |
| 2011/0055707 A1* | 3/2011 | Kimmet | G06F 8/61 715/735 |
| 2012/0066670 A1* | 3/2012 | McCarthy | H04L 41/0806 717/169 |
| 2013/0030858 A1* | 1/2013 | Gupta | G06Q 10/0631 705/7.23 |
| 2013/0254738 A1* | 9/2013 | Chaar | G06F 8/20 717/101 |
| 2014/0075035 A1* | 3/2014 | Revanuru | G06F 9/5072 709/226 |
| 2014/0075431 A1* | 3/2014 | Kumar | G06F 8/61 717/175 |
| 2016/0188323 A1* | 6/2016 | Nagaraja | G06F 8/61 717/101 |

OTHER PUBLICATIONS

Waheed Iqbal et al.; Adaptive resource provisioning for read intensive multi-tier applications in the cloud; 2011 Elsevier; pp. 871-879; <http://www.sciencedirect.com/science/article/pii/S0167739X10002098>.*

Kyong Hoon Kim et al.; Power-aware Provisioning of Cloud Resources for Real-time Services; 2009 ACM; 6 pages; <http://dl.acm.org/citation.cfm?id=1657121>.*

Rajiv Ranjan et al.; Peer-to-Peer Cloud Provisioning Service Discovery and Load-Balancing; 2010 Springer; pp. 195-217; <http://link.springer.com/chapter/10.1007/978-1-84996-241-4_12#page-1>.*

Rodrigo N. Calheiros et al.; Virtual Machine Provisioning Based on Analytical Performance and QoS in Cloud Computing Environments; 2011 IEEE; pp. 295-304; <http://ieeexplore.ieee.org/stamp/stamp.jsp?tp=&arnumber=6047198>.*

Michael Armbrust et al.; A View of Cloud Computing; 2010 ACM; pp. 50-58; <http://dl.acm.org/citation.cfm?id=1721672>.*

Integration Platform as a Service (iPaas). Gartner. Web. Jul. 29, 2014. <http://www.gartner.com/it-glossary/information-platform-as-a-service-ipaas.> (Discussed on p. 1 of the specification).

About IFTTT. IFTTT. Web. Jul. 29, 2014. <https://ifttt.com/wtf> (Discussed on p. 6 of the specification).

Zapier. Web. Jul. 29, 2014. <https://zapier.com> (Discussed on p. 6 of the specification).

Informatica Cloud. Web. Jul. 29, 2014. <http://www.informaticacloud.com/> (Discussed on p. 6 of the specification).

Dell Boomi. Web. Jul. 29, 2014. <http://www.boomi.com/> (Discussed on p. 7 of the specification).

SnapLogic. Web. Jul. 29, 2014. <http://www.snaplogic.com/> (Discussed on p. 7 of the specification).

IBM Corporation, "Application Deployment Automation from Development to Production". IBM UrbanCode Deploy. Somers, New York. Aug. 28, 2013.

* cited by examiner

DEFAULT STAGE

DEFAULT STAGE PLUS LIVE STAGE

FIG. 10

EXAMPLE OF ADDING A CONNECTION

Integration Live     Home   Integrations   Applications   Settings

Applications   Accounts   Integration Templates

< Salesforce      Add Account

New [ ] Account

Account Name: *   | My Salesforce Account |
e.g. My ((ConnectorName)) Account

Description   | My private Salesforce Account |

Stages Account Configuration (?)    1003    1001     Stages Management

Default \ Live

| Server URL:* | https://login.salesforce.com/services/Soap/u/25.0 | ⓘ |
| Proxy Server Alias: | | |
| Username:* | japplesed | |
| Password:* | •••••••• | * |
| Authentication Type:* | none ▼ | |

1007—

☒ Copy settings to all other stages

1005

Cancel   Save All Shapes   Save

Powered by Software AG

SYSTEM AND METHOD FOR STAGING IN A CLOUD ENVIRONMENT

TECHNICAL FIELD

The technical field relates in general to staging processes used in a cloud environment.

BACKGROUND

With the establishment of cloud services and applications, the data these applications produce can be widely dispersed. For example, a company may have all of its sales operations maintained by one cloud service (for example, currently at salesforce dot com), while all if its accounting data is maintained in another cloud service (for example, currently at workforce dot come). In both cases the information pertaining to a business customer must be maintained. The complexity of maintaining such information increases even further for large organizations that have significant data located on site because that on-site data also needs to be integrated with various cloud applications.

Such data distribution requires integration between the various applications (referred to as "end points"). The integration is implemented as integration flow and should be seen as simple data synchronization or orchestration of complex logic that manipulates and transforms the data. Typically, an Enterprise Service Bus (ESB) type of software conducts the implementation on site.

If the data lives in the cloud it is natural for the integration to happen in the cloud as well. These cloud integration services are referred to as "Integration Platform as a Service" (iPaaS) and may be defined as a suite of cloud services enabling development, execution and governance of integration flows connecting any combination of on-premises and cloud-based processes, services, applications and data within individual or across multiple organizations. A discussion of iPaaS is provided at gartner dot com.

An important issue with integration in general is that it manipulates systems of record in an automated way. It modifies large quantities of business critical data. Therefore proper testing and validation procedures are essential.

Conventional cloud based software itself and the iPaaS can be introduced/developed very fast in an organization. The software has zero footprint, usually is very fast to purchase and the end users can quickly start creating integrations. That instant behavior is transferred to the lifecycle of the created integrations. One can create, change and execute the integrations easily.

The problem with the instant change and execution is that an error could unwittingly change a large dataset. In some cases the error could be even unnoticed.

SUMMARY

Accordingly, one or more embodiments provide a method, system and/or non-transitory computer readable medium for staging in a cloud environment.

Accordingly, an embodiment provides a method for staging in a cloud environment comprising defining, by a processor, a default stage for creating and editing integration flows; receiving, by the processor, (a) stages including (i) an input live stage to follow the default stage, (ii) additional input stages between the default stage and the live stage, and (b) (iii) input endpoint definitions for the input live stage and each of the additional input stages, which results in generating the integration flow which is defined by the stages and the endpoint definitions; receiving, by the processor, an instruction to promote the input integration flow; load balancing, by the processor, the input integration flow by allocating the live stage and the additional input stages to one or more execution environments; and running, by the processor, the input integration flow in the one or more execution environments. Upon receiving each of the input live stage and the additional input stages, the processor (i) retrieves a list of available execution environments, (ii) selects a set of execution environments, and (iii) stores the selected set of available execution environments.

Another embodiment includes, in response to a request to delete one of the stages: deleting the stage from the integration flow, and releasing the selected one or more execution environments to the available execution environments.

According to another embodiment, the load balancing step may be automated based on pre-defined rules.

According to yet another embodiment, the load balancing step may be manually controlled by a user.

According to another embodiment, the running of the input integration flow may be scheduled for a specific day and time.

According to still another embodiment, the method further comprises maintaining revision history of the input integration flow.

According to another embodiment, the endpoints have definitions associated with each of the live stage and the additional input stages.

An embodiment provides a system, for staging in a cloud environment, that comprises a processor configured to define a default stage for creating and editing integration flows; receive an input integration flow by receiving (i) an input live stage to follow the default stage, (ii) additional input stages between the default stage and the live stage, and (iii) input endpoint definitions for the input live stage and each of the additional input stages; receive an instruction to promote the input integration flow; load balance the input integration flow by allocating the live stage and the additional input stages to one or more execution environments; and run the input integration flow in the one or more execution environments. Upon receiving each of the input live stage and the additional input stages, the processor (i) retrieves a list of available execution environments, (ii) selects a set of execution environments, and (iii) stores the selected set of available execution environments.

According to another embodiment, the processor is further configured to perform according to the above methods.

Yet another embodiment provides a non-transitory computer readable medium, which can perform a method according to one or more of these embodiments.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 10 is a block diagram illustrating an example of adding a connection;

DETAILED DESCRIPTION

I. Introduction

Figure 1:
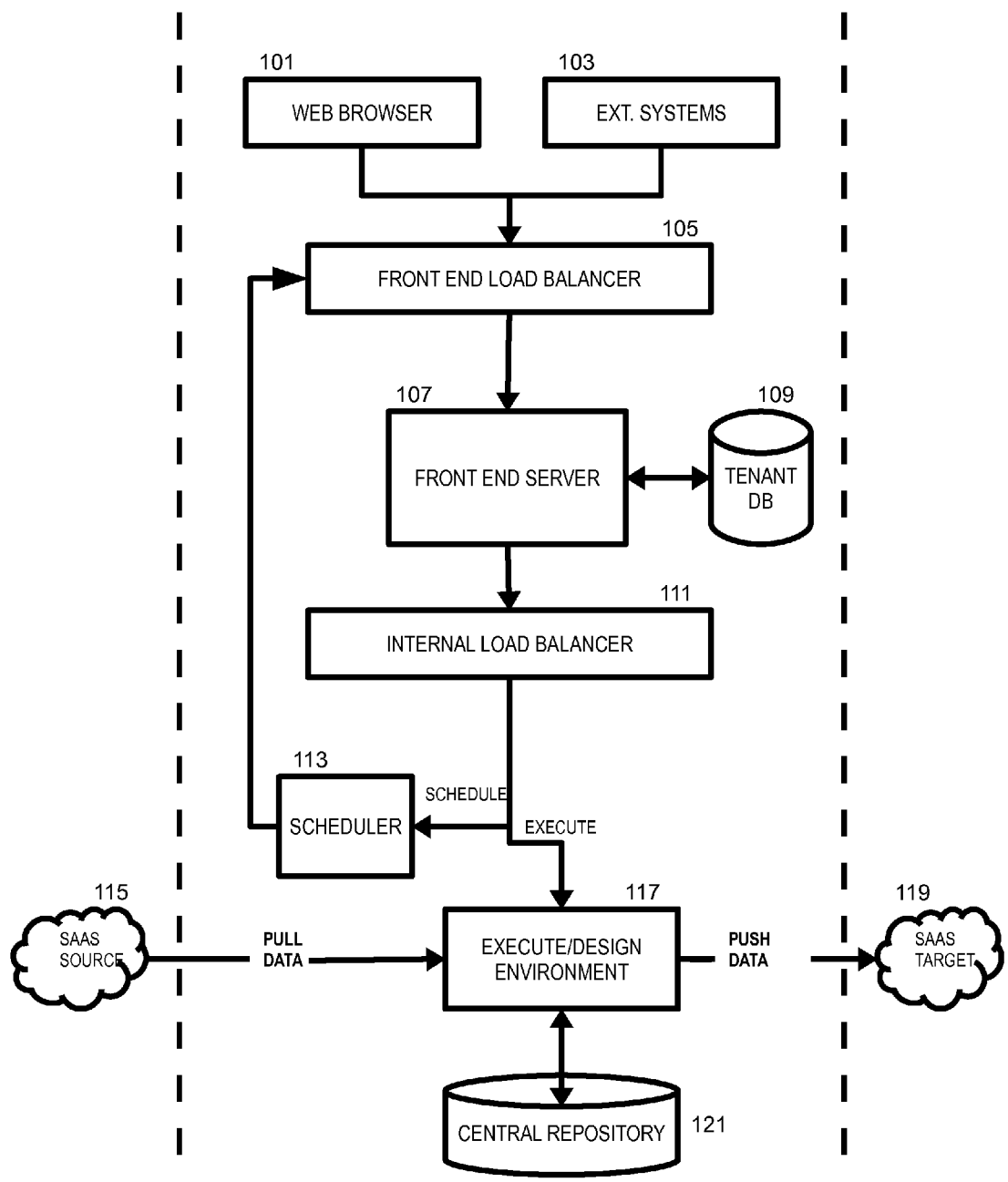
FIG. 1 is a block diagram illustrating the overall architecture of the system and method for staging in a cloud environment, in a typical environment.

In overview, the present disclosure concerns a system for staging processes in a cloud environment. More particularly, various inventive concepts and principles are embodiments in methods, devices, and/or systems related to the staging system which may include life cycle, testing, deploying, and/or other staging aspects. The manner of deploying applications that communicate within different clouds may be controlled. An automated and dynamic way can be provided to introduce and/or maintain different stages (sometimes referred to as versions) of information. The process for creating and maintaining new stages can be streamlined. Load-balancing, scaling and security may be added to the process in a flexible manor. The various stages may be defined following the designation of the first stage (which may be considered a default stage) and next stage (which may be considered a production stage). Upon the condition of further required tests, more stages may be defined and included between the default stage and the production stage.

Discussed herein is staging concept (life cycle, testing, deploying, etc.) and example implementations, useful with processes, which may be located in one or more cloud environments in which resources are intended to be shared with other computers. In a particular example, in the case of an (Integrated) Platform as a Service environment, there is the need for a more controlled way to deploy applications that communicate within possibly different clouds. Providers of conventional PaaS applications do not have any automated and dynamic way to introduce and maintain different stages. Conventionally, the process consists of many manual steps and is not easily controlled.

The requirements for staging in a cloud application environment are more complex than encountered in an ordinary on-site application life cycle process. Inventive steps can be observed in the way that a new stage can easily be created and maintained. Also, additional features, such as load-balancing, scaling and/or security may be included.

Moreover, according to embodiments herein, the stages can be defined in series, for example, after the first (Default) stage, the next stage may be the Production stage. One or more stages may be defined between two already existing stages, stages may be deleted, and existing stages may be edited.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

One or more embodiments discussed herein can address the aforementioned problems with traditional systems, by providing a built-in promotion process for integration flow. The system and method for staging in the cloud enables integration flow to be modified instantly by one group of users (for example, developers). Once the change is ready, a copy of it can be created as a separate instance controlled and operated by a different group of users (for example, administrators). The instance creation and the overall promotion process can be governed by the iPaaS using a special workflow. The original flows are unmodified and with the promotion from one environment to another the accounts for end points used in the integration may be automatically adjusted.

II. Problem Presentation

Cloud application and integration platforms as emerging technology do not necessarily address the concept of staging environments. Instant creation is a general practice. The user logs in, changes an integration flow and it is instantly active. There are two classes of iPaaS. The first category is referred to as "only data synchronization pattern providers." The second category is referred to as "data orchestration pattern providers."

The "only data synchronization pattern providers" move data from source endpoint to a target endpoint. Examples of these types of providers are described at the following websites: iftt dot com, zapier dot com, and informaticacloud dot com.

The "data orchestration pattern providers" provide sophisticated ESB like functionality. Examples of these types of providers may be found at the following websites: boomi dot com and snaplogic dot com.

Both of these types of providers incorporate the concept of instant change of the integration flow. In order to simulate the promotion process one needs to have either different registrations to these services or manual copies of the integration flows with manual changes of the endpoint definitions.

The traditional approaches do not provide a Development→Test→Production process. Each user of the "data synchronization only pattern providers" must subscribe/login itself several times and simulate the promotion process by recreating the integration flow from scratch using different endpoints. Some of the "data orchestration pattern providers" allow execution of the same flow on different environments but the process is manual and requires manual changes in the flow to rewire it to different endpoints. A key dilemma with conventional approaches is that the endpoint definition (the "Salesforce account", the on-premise SAP instance, etc.) is part of the integration flow.

III. Overview and Aspects of the Approach

In the present staging system the endpoint definition is abstracted as an endpoint name, and the detailed endpoint definitions are associated with stages. Each of the stages includes one or more virtual execution environments that are defined by the user. The stages hold information for specific endpoint definitions. For example, the Development stage will have under "Salesforce account" name a definition of a Salesforce test account while the Production stage will have the real account details.

When a flow is moved from stage to stage the system automatically wires the new endpoint definition using an endpoint name.

The stages will have separate load balancing and failover capabilities. The system can also automatically calibrate itself based on the load in the different stages.

Reference is made to FIG. 1, which illustrates an example overall architecture of the system, for example in a typical environment. The architecture elements may include the web browser 101, the ext. systems 103, front end load balancer 105, front end server 107, tenant database 109, internal load balancer 111, scheduler 113, SaaS source 115, execute/design environment 117, SaaS target 119, and the central repository 121. The staging system may be split into two major areas: (1) front end servers, here represented by front end server 107, and (2) execution environments, here represented by execution/design environment 103. The tenant database 109 can hold the information of all tenants and their users. The central repository 107 can contain, among other things, the source code for all integration flows and can be used for the promotion between stages. The execute/design environment pulls data from the SaaS source and pushes data to the SaaS target.

A stage may be defined in the tenant database 109 and may be a set of one or more execution environments. The number of servers per stage can depend on the service level agreements, the load profile, and other parameters. Since all of the code is in the central repository 121, the code may be automatically deployed on all servers of each stage.

The default stage is available by default for all tenants and is also the design environment. This stage is used for designing the flows and for instant execution with iPaaS providers. The other stages are defined by the users/tenants.

In order to provide proper governance over the stages and the promotion process, a distinctive user interface (UI) may be used. The UI may include one or more of the following primary elements: (A) stage definition; (B) endpoint definition; and (C) integration flow promotion. Each of these is discussed below.

A. Stage Definition

The UI controls the stage definitions and provides the health status of each stage. FIG. 2 to FIG. 5 are examples of a window which indicates the available stages in series, and optionally to include additional information about each stage such as name and status.

In this example, the stages may include one or more of a default (or design stage; the design stage is sometimes referred to as the development stage), a test stage, a pre-live stage, and a live stage (sometimes referred to as a production stage). These stages can occur sequentially. The test stage and pre-live stage are representative of any number of stages between the design and live stages.

Figure 2:
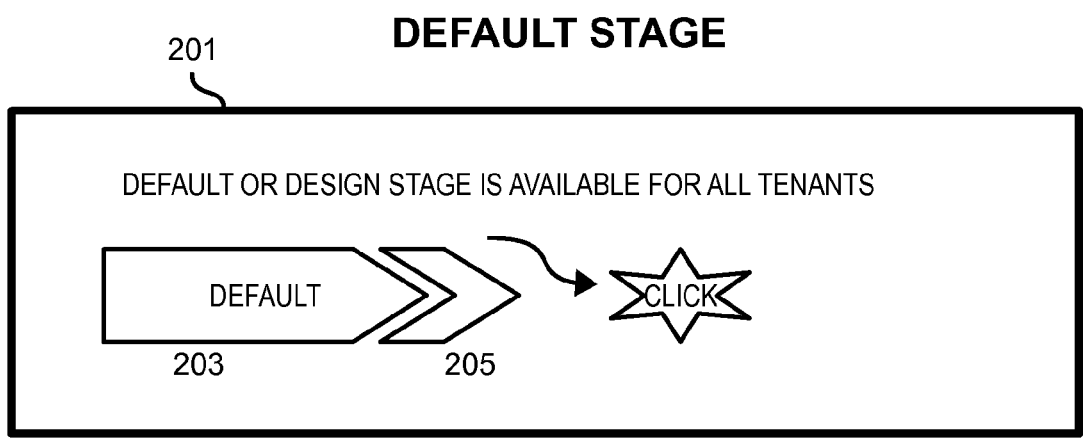
FIG. 2 is a block diagram illustrating a window with the default stage.

Reference is now made to FIG. 2, a block diagram illustrating a window 201 with the default stage 203. The window 201 with the default stage 203 is used for creating and editing flows. The icon 205 represents a location, in the series, where additional stages may be added by clicking on the icon 205. The default (or design stage) window screen 201 is automatically available for all tenants.

Figure 3:
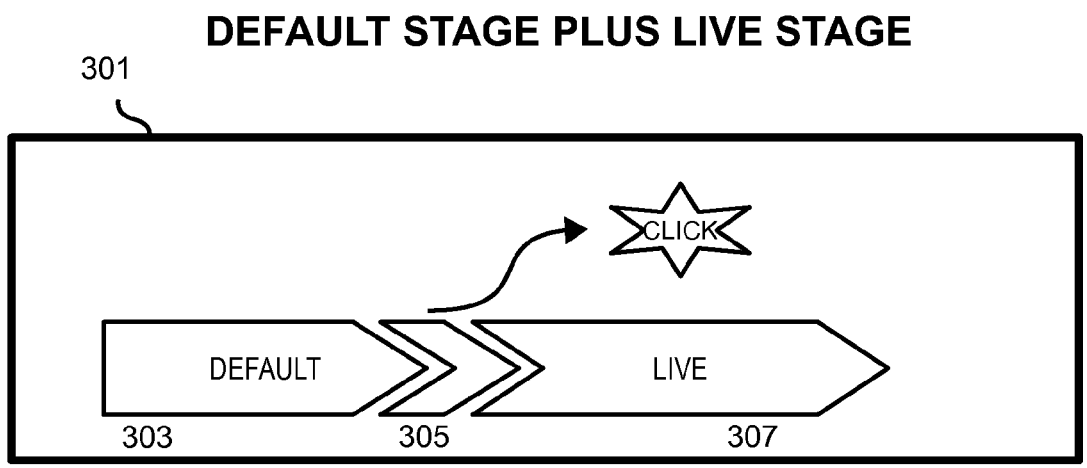
FIG. 3 is a block diagram illustrating the window with the default stage plus the live stage.

Now turn to FIG. 3, a block diagram illustrating a window 301 with the default stage 303 plus a live stage 307. After the default stage 303, the next stage that the tenant can create is the live (production) stage 307. This provides organizations with a simplified process that requires only development and production. The icon 305, located between the default stage 303 and the live stage 307, represents the location where additional stages may be added by clicking on the icon 305.

Figure 4:
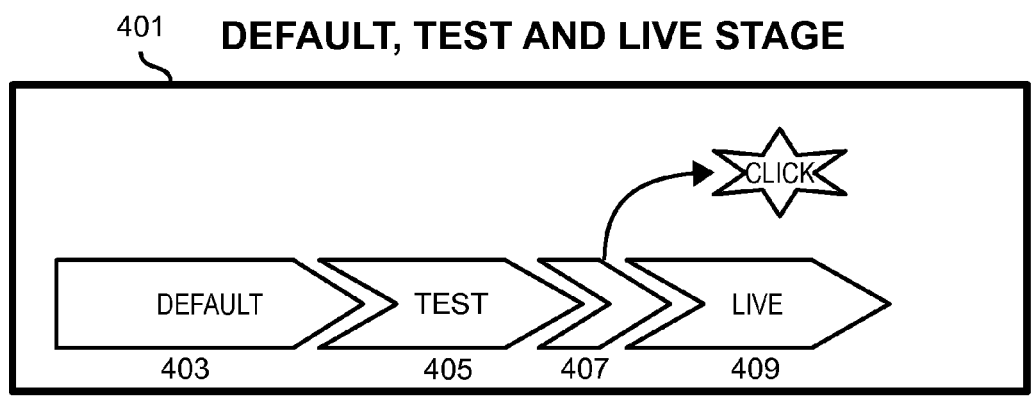
FIG. 4 is a block diagram illustrating the window with a default, test and live stages.

Reference is now made to FIG. 4, a block diagram illustrating a window 401 with the default stage 403, test stage 405, and live stage 409. When an organization would like to implement more process steps, such steps may be introduced between the default (development) stage and the live (production) stage by clicking on the icon 407. The embodiment exemplified in FIG. 4 includes one additional stage (the test stage 405) between the default stage and the live stage.

Figure 5:
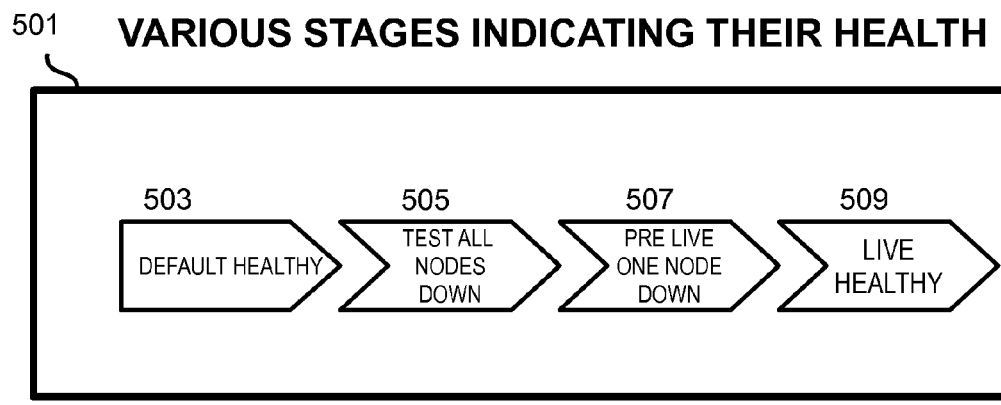
FIG. 5 is a block diagram illustrating the window with a series of stages and the status condition of each stage.

Reference is now made to FIG. 5, a block diagram illustrating a window 501 showing the stages in series and their "health status". The embodiment exemplified in FIG. 5 includes two additional stages, the test stage 505 and the pre-live stage 507, between the default stage 503 and the live stage 509. The status of each stage is identified. The default stage 503 is "healthy." The test stage 505 has all nodes down. The pre-live stage 507 has one node down. The live stage 509 is "healthy." A "health status" of a stage can be determined using conventional techniques, for example, routine or requested testing of the hardware and/or software components of a stage, such as indicated by the execution environment(s) defined for the stage.

A single stage may be backed by one or more execution environments. The load balancer can select and assign an execution environment to a stage based on a policy associated with the load balancer, when the tenant requests to run a flow. (It may be noted that the phrase to "run a flow" is used interchangeably herein with the phrase to "execute a flow.") If an execution environment is down, the load balancer can pick the next environment based on its policy. This enables the system to support various service level agreements depending on, for example, the tenant pay level.

Figure 6:
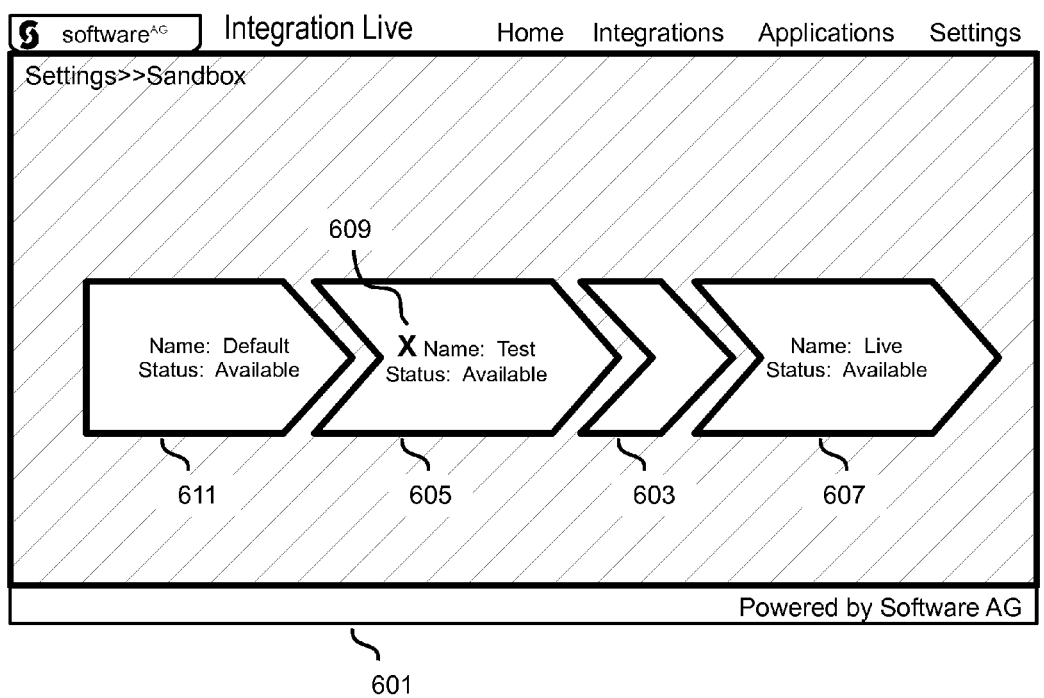
FIG. 6 is a block diagram illustrating a partial example of the user interface (UI)

Reference is now made to FIG. 6, a block diagram illustrating another example of a window in a UI 601, which contains a default stage 611, a test stage 605, a shorter arrow icon 603 and a live stage 607. With this window, the user can use a mouse to click on the shorter arrow icon 603 (which indicates a possible new stage), which is a new stage indicator interposed in series between two stage indications (here, the test stage 605 and the live stage 607), so as to create another new stage between the test stage 605 and the live stage 607. Any conventional or known user input may be used as an alternative to the mouse click. The X icon 609, located on the representation of the test stage 605, is representative of a command that allows for the selected stage to be deleted. Both the new stage indicator and the delete command (the shorter arrow 603 and the X icon 609) can provide guided stage creation order.

B. Endpoint Definition

Figure 7:
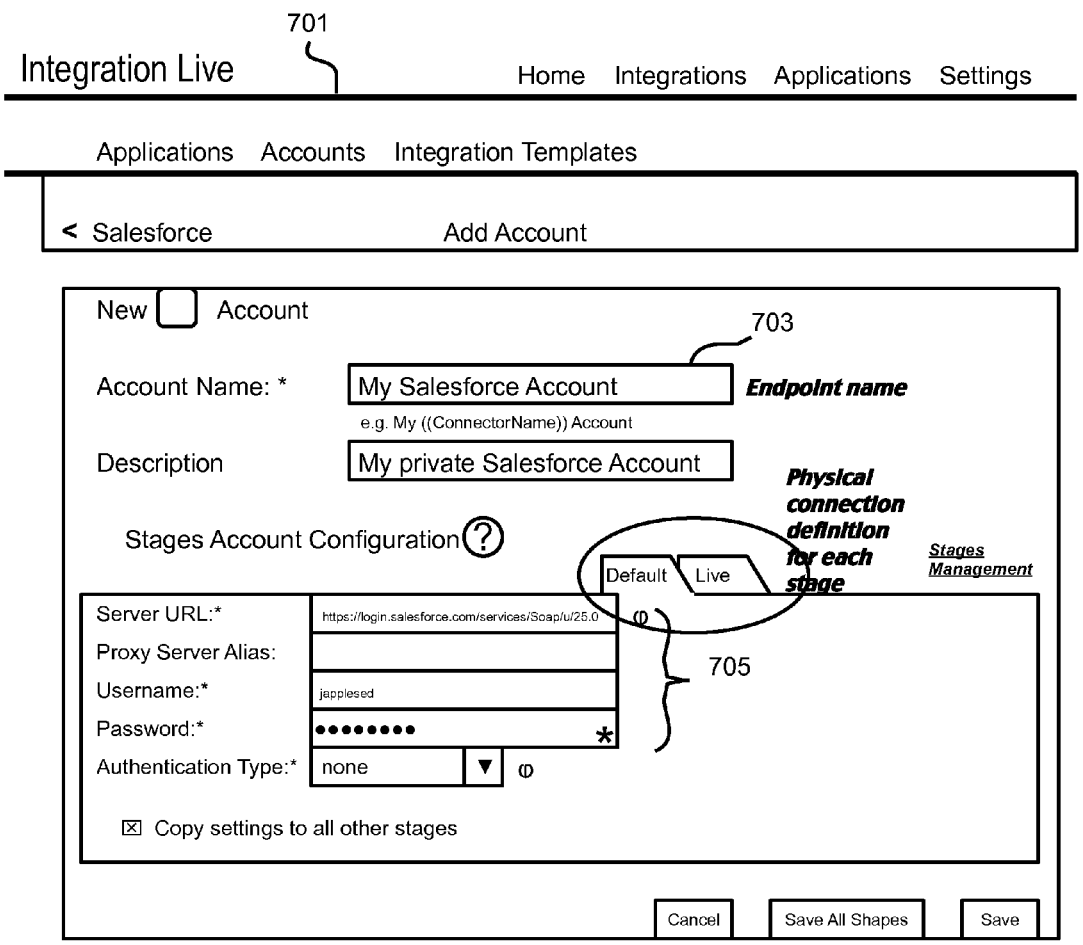
FIG. 7 is a block diagram illustrating a UI for endpoint definition.

Referring now to FIG. 7, a block diagram illustrating a UI for endpoint definition 701 will now be discussed and described. The endpoints have definitions associated with each stage. Continuing with the "Salesforce" example, a user may set up "Salesforce" endpoint connection details for each stage. The endpoint name 703, here, "My Salesforce Account", can be an alias that cannot be changed. The endpoint name 703 is used in the integration flows. Physical connection definitions 705 can be defined for each stage. Examples may include unique location identifiers (such as server URL) plus access information (username, password, and authentication type if applicable) used to be allowed to execute at a location. The physical connection (location identifier and access information) can be used as the integration moves between stages to the different environments. Endpoints can be shared across the different integration flows and the physical connection definitions 705, as referenced by their respective endpoint names, can be reused across the staging system.

C. Integration Flow Promotion

The actual promotion of the integration flows occurs directly from an integration list so that the user may manage the execution scheduling at each stage. The stages can have different access rights and different user groups may operate on each stage.

Figure 8:
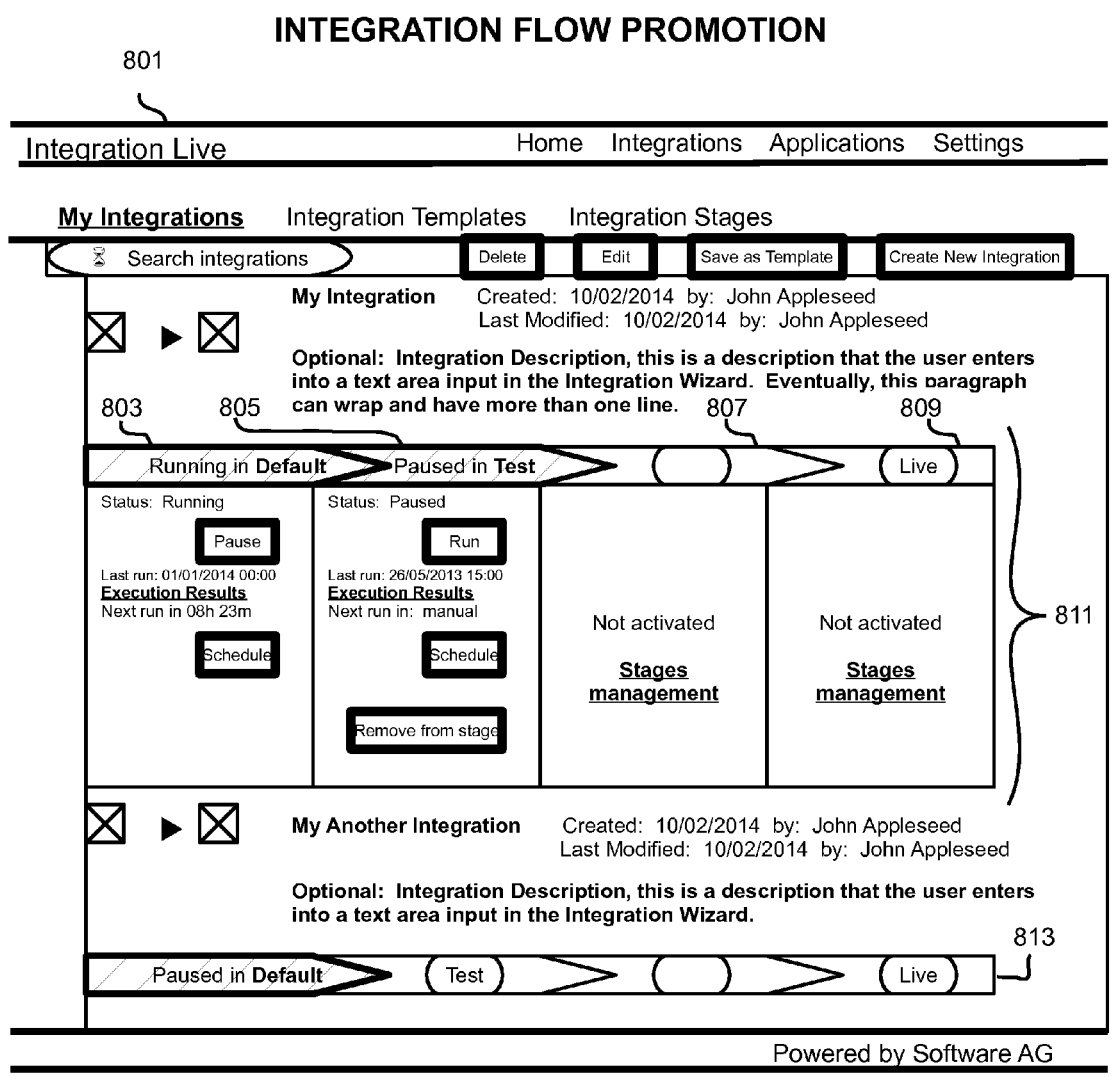
FIG. 8 is a block diagram illustrating integration flow promotion.

FIG. 8 is an example user interface 801 illustrating the integration flow promotion. The flow promotion process may be predefined and tightly controlled in case the end users are not very technical. Conversely, the flow promotion process may be completely open via API, such as for use by organizations experienced in IT operations. The flow promotion UI 801 enables the user to create, delete and edit integrations.

The flow promotion UI 801 illustrates two integration flows, "My Integration" flow 811 and "My Another Integration" flow 813. For each integration flow, each of the represented stages shows the direction of flow from/to each of the stages and a stage of the overall integration flow. For example, "My Integration" flow 811 consists of a default stage 803, a test stage 805, and a live stage 809. More stages may be added at location 807.

The illustration of the integration flow can be expanded to itemize, closely associated with each of the stages (for example, as a pull-down window), an indication of status of the execution (for example, "running", "paused", "not activated", etc.), execution results, and optionally schedule information such as last run and/or next run. Each stage can be individually managed by selecting the stage, for example, to run the stage, to pause the stage, and/or to change the schedule information for the stage. For example, default stage 803 is running and test stage 805 is paused.

IV. Example Implementation(s)

An example implementation is now discussed, in connection with the example overall architecture of the system for staging in a cloud environment illustrated in FIG. 1, which was outlined above.

A. Creating a New Stage

When a user/tenant creates a new stage, the staging system performs the following operations:
1. an entry for the stage is recorded in the tenant database
2. look up a list of available execution environments (sometimes referred to as an "integration list")
3. select a set of execution environment(s)
4. update the internal load balancer for the tenant's stage with the set of selected servers.

Figure 9:
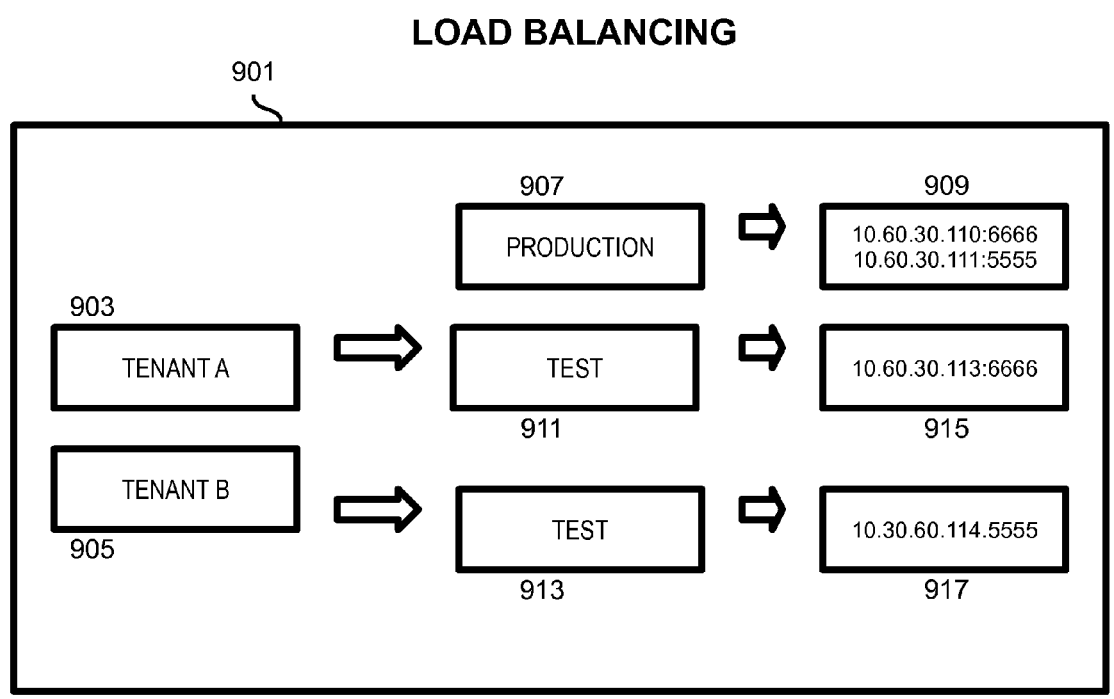
FIG. 9 is a block diagram illustrating load balancing.

The system separates the stage definition ("resource") and the mapping of physical machines to that resource. Referring now to FIG. 9, a block diagram illustrating the load balancing process 901 will now be discussed and described. The stage definitions can be prepared, for example by Tenant A 903 and Tenant B 905 using the UI, and the stage definitions can be stored in a database (not illustrated). The mapping to the physical machines can be done on the load balancing level using the stage definitions 907, 911, 913, and the list of available execution environments. That allows flexible allocation of as many execution environments as necessary in a single location. In this example, regarding the load balancing, the production stage 907 is allocated by the load balancing process to the machines identified in machine ID block 909. The test stages 911 and 913 are allocated by the load balancing process to the machines identified in machine ID blocks 915 and 917, respectively.

As the execution environments can be aware of many tenants (sometimes referred to as "multi-tenant aware"), the cardinality of the relationship between tenants and resources is many to many. Each tenant can have more than one resource and one resource can be shared with more than one tenant. For example, the default stage could be shared freely for all tenants, while the ones that have already subscribed and are financially involved, for example, can be allocated to a different set of execution environments. The load balancing construct allows flexible allocation of execution nodes. On one hand, the free registrations can be clubbed together on a few selected nodes for high availability. On the other hand, the high volume customers can be separated for meeting the SLAs.

The allocation of the different execution environments can be done automatically by the system upon certain rules or can be given to the tenant for management via the Stages Definition UI.

B. Deleting a Stage

When a tenant deletes a stage, the staging system performs the following operations:
1. entry for the stage is deleted from the tenant database
2. execution environments for the tenant for the stage are released (since the system runs in a virtual environment the machines can be simply deleted)
3. internal load balancer is updated to reflect that the stage has been deleted.

C. Creating and Testing Integration Flow

There may be at least two alternative ways to initiate creation of an integration flow:
1. A user logs on the web application. The default stage was previously set up and is presented to the user. This is the stage that the user can use to create a flow.
2. If an account does not exist, the user can create an account on the source and target provider for the default (design) stage.

Referring now to FIG. 10, a block diagram illustrating an example of adding a connection will now be discussed and described. FIG. 10 includes many of the elements of FIG. 7, which are not re-numbered in FIG. 10. A user can create a single named connection across multiple stages. If the user has a separate Live stage 1001, then he can provide account details under a Default stage tab 1003 and a Live stage tab 1001 separately. The user may also choose to use the same credentials for all the stages. For convenience, there may be a copy function 1005 that allows the account information to be copied between stages.

The purpose of copying is just to provide an ease of use. Preferably, the password 1007 may not be copied over and/or the copied data can be modified. Additionally, the system may indicate that the physical connection is reused across stages.

The following steps may be used to create and test an integration flow.

1. Responsive to a create-operation request from the user, the system creates an operation, which may be used as a source or target operation in one or more flows. In creating the operation, the system receives inputs from the user which specify the operation, business object and one or more parameters. For example: the operation is specified as "getAccount"; the business object is specified as "account", and the parameters could be specified as "id", "name", and the like, which are fields of the business object.

2. Responsive to a create-integration flow instruction from the user, the system creates an integration flow. Together with the integration logic the user specifies the endpoint names. The integration is saved in the Default environment and is ready for execution.

3. In this example, the user wishes to promote the flow that he has created for special tests using different physical connections to the endpoints.

4. Responsive to a create-stage instruction from the user, a new stage is created by the system. A stage may have been already created by another user having administration rights.

5. The system determines whether this is a case in which the physical connections are not defined. If so, the system receives inputs from the user to fill in the account details for that stage, for the source and target Provider. Otherwise, the already available connection definitions can be used.

6. The user can instruct the system to pull the integration flow to that stage along with its dependencies. The dependencies of an integration flow can include source and target accounts, source and target operations. When the integration flow is pulled, the accounts and operations will also be copied from the default stage to the stage to which it is pulled.

The automatic pulling mechanism provides an ease of use. Once the accounts for each stage are configured, no additional configuration is required. By comparison, in the current state of art the user may have to repeatedly create several flows each differing only in its account. This would be very cumbersome.

7. When the integration is run on a stage, for example in response to a user indicating that the stage is ready, a request for integration flow is sent to the load balancer. The load balancer may store an indication of the upstream configuration indicating the upstream servers for the tenant's stage. This configuration with regard to upstream servers may be updated, for example, when the stage was created. The load balancer selects the request to the execution environment that it picks up from the upstream configuration based on the policy of the load balancer, and redirects the request to the selected execution environment. The integration flow will now be run on the selected execution environment, in response to receipt of the request.

D. Procedure Flow

Figure 11:
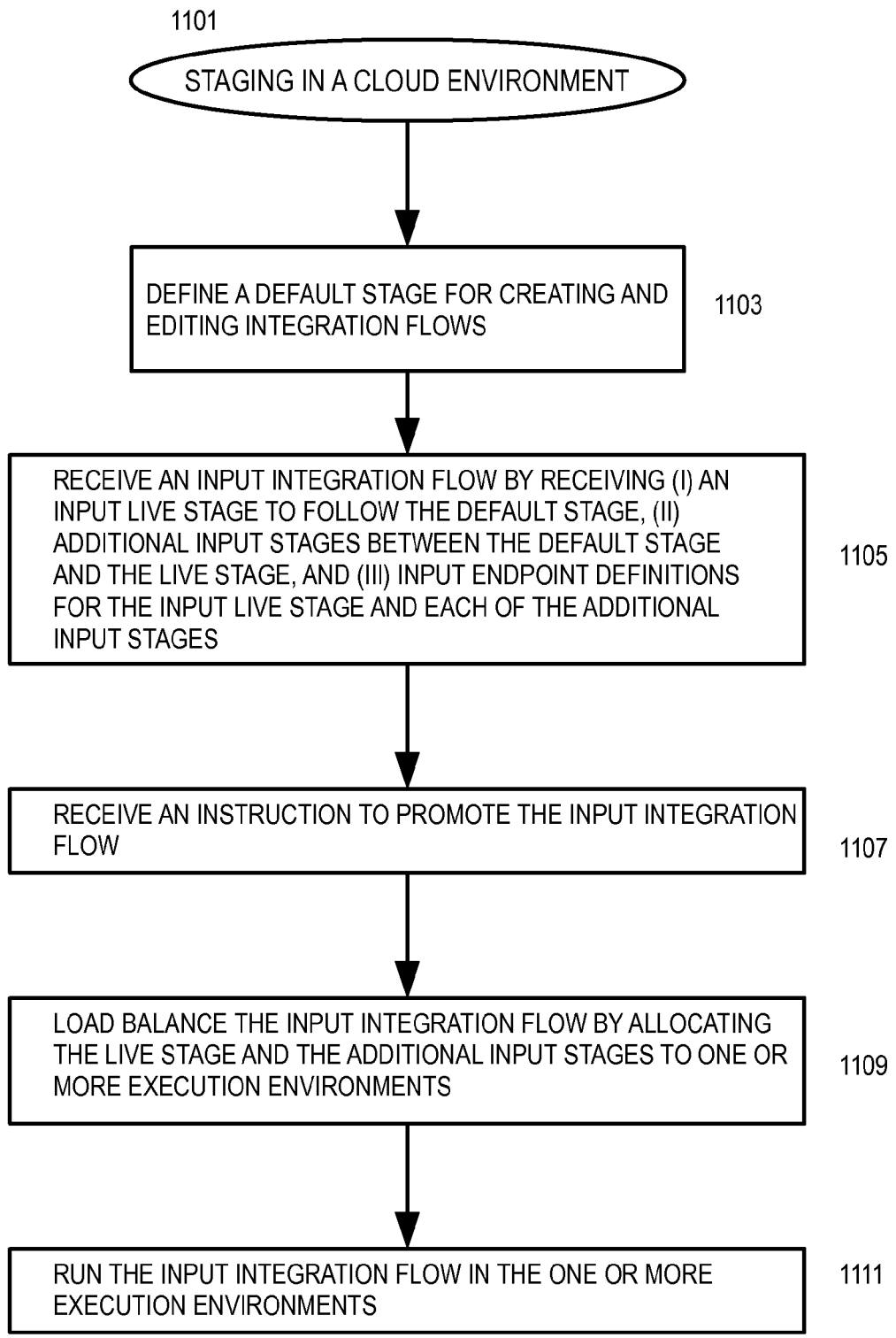
FIG. 11 is a flowchart of the process for staging in a cloud environment.

Reference is now made to FIG. 11, a flow chart illustrating a procedure 1101 for staging in a cloud environment. The procedure 1101 may be implemented on, for example, the computer system of FIG. 12, optionally distributed as illustrated according to FIG. 1, or other system appropriately configured. The procedure 1101 defines 1103 a default stage for creating and editing integration flows. The procedure 1101 receives 1105 an input integration flow by receiving (i) an input live stage to follow the default stage, (ii) additional input stages between the default stage and the live stage, and (iii) input endpoint definitions for the input live stage and each of the additional input stages. The procedure 1101 receives 1107 an instruction to promote the input integration flow. The procedure 1101 load balances 1109 the input integration flow by allocating the live stage and the additional input stages to one or more execution environments. The procedure 1101 runs 1111 the input integration flow in the one or more execution environments. Upon receiving each of the input live stage and the additional input stages, the procedure 1101 (i) retrieves the list of available execution environments, (ii) selects a set of execution environments, and (iii) stores the selected set of available execution environments.

E. Additional Considerations

At every stage that is indicated to be healthy, the integration flow can be scheduled to run at a specified time and day. The integration may be run on a particular stage using the endpoint definition's account specified by the user for the particular stage. Schedules can be managed using conventional techniques for schedule management, by a distributed database backed scheduler that runs the flow at the specified schedule. The QUARTZ scheduler, currently available at quartz-scheduler dot org, for example may be used.

Only certain roles may be allowed to modify (pull) each of the stages. For example, only the production administrators can be allowed to pull the production (Live) stage, while a developer may not.

The same integration may be made available in different stages, for example to increase redundancy. If a stage is down, the same integration may be picked up from a stage which is available. There may be provided a version control system that maintains a revision history, using conventional techniques, of the integration flow.

Advantageously, the user can modify the integration only at the Default (design) stage. Every time the user modifies the integration a new version of the integration may be created. Preferably, only the latest version can be pulled over to the next stage. This may be done only in order to eliminate the need for the users to deal with differences between stages. There is no technical limitation to edit the integration flows on all stages.

F. Computer System Implementation Example

Figure 12:
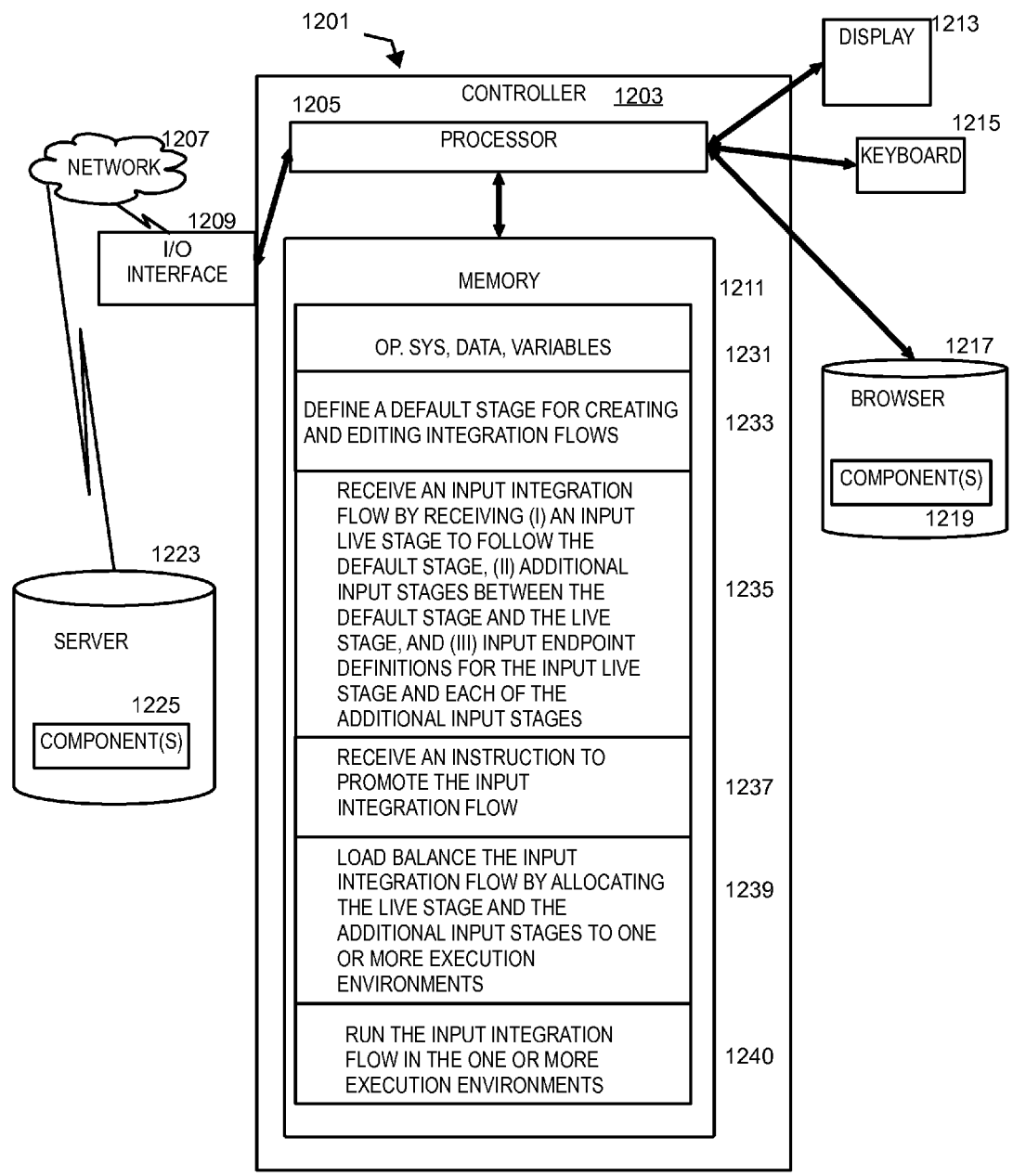
FIG. 12 is a block diagram that depicts relevant portions of a computer system for staging in a cloud environment.

FIG. 12 is a block diagram illustrating relevant portions of a computer system 1201, on which the staging in a cloud environment may be implemented. The computer system 1201 may include one or more controllers 1203, a processor 1205, an input/output (i/o) interface 1209 for communication such as with a network 1207, a memory 1211, a display 1213 (optional), and/or a user input device (also optional) such as a keyboard 1215. Alternatively, or in addition to the keyboard 1215, a user input device may comprise one or more of various known input devices, such as a keypad, a computer mouse, a touchpad, a touch screen, and/or a trackball. The display 1213 may present information to the user by way of a conventional liquid crystal display (LCD)

or other visual display, and/or by way of a conventional audible device (for example, a speaker) for playing out audible messages. Portions of the computer system 1201 are well understood to those of skill in this area and have been omitted to avoid obscuring the discussion.

The processor 1205 may comprise one or more microprocessors and/or one or more digital signal processors. The memory 1211 may be coupled to the processor 1205 and may comprise a read-only memory (ROM), a random-access memory (RAM), a programmable ROM (PROM), and/or an electrically erasable read-only memory (EEPROM). The memory 1211 may include multiple memory locations for storing, among other things, an operating system, data and variables 1231 for programs executed by the processor 1205; computer programs for causing the processor to operate in connection with various functions such as defining 1233 a default stage for creating and editing integration flows; receiving 1235 an input integration flow by receiving (i) an input live stage to follow the default stage, (ii) additional input stages between the default stage and the live stage, and (iii) input endpoint definitions for the input live stage and each of the additional input stages; receiving 1237 an instruction to promote the input integration flow; load balancing 1239 the input integration flow by allocating the live stage and the additional input stages to one or more execution environments; and running 1240 the input integration flow in the one or more execution environments. The computer programs may be stored, for example, in ROM or PROM and may direct the processor 2005 in controlling the operation of the computer 1201. Each of these functions is considered in more detail below, to the extent that it is not detailed elsewhere in this document.

The user may invoke functions accessible through the user input device such as the keyboard 1215. The user input device may comprise one or more of various known input devices, such as a keyboard (1215, illustrated) and/or a pointing device, such as a mouse; the keyboard 1215 may be supplemented or replaced with a scanner, card reader, or other data input device; and the pointing device may be a mouse, touch pad control device, track ball device, or any other type of pointing device.

Responsive to manual signaling from the user input device represented by the keyboard 1215, in accordance with instructions stored in memory 1211, and/or automatically upon receipt of certain information via the i/o interface 1209, the processor 1205 may direct the execution of the stored programs.

The computer 1201 can utilize a browser 1217, which includes several browser component(s) 1219. The computer 1201 can access a server 1223 on which is stored one or more components, here represented by server component(s) 1225. Although the components 1225 are illustrated as accessed over the network 1207, the components 1225 may be remotely and/or locally accessible from the computer 1201, over a wired and/or wireless connection; the components 1225 do not need to be limited to a database or a server. Techniques are known for accessing components located in a server 1223, and the like. With regard to the server 1223 and browser 1217, it may be noted that the computer programs stored in the memory 1211 are illustrated on the controller 1203. In a client/server embodiment, one or more of the computer programs conveniently may be distributed to the server, such as those marked "SERVER", and one or more of the computer programs conveniently may be distributed to a client side, such as those marked "CLIENT". In such a situation, the server 1223 may omit the client computer programs, and the client may omit the server computer programs. In another embodiment, the computer programs may be included on a non-client-server architecture, and the requests between client-server may be omitted.

The processor 1205 may be programmed to define 1233 a default stage for creating and editing integration flows. As discussed elsewhere, the default stage can include default values for an initial stage, and may be created in response to a user initiation of an integration flow.

The processor 1205 may be programmed to receive 1235 an input integration flow by receiving (i) an input live stage to follow the default stage, (ii) additional input stages between the default stage and the live stage, and (iii) input endpoint definitions for the input live stage and each of the additional input stages. Each of the stages are intended to follow in sequence, beginning with the default stage (otherwise referred to as the "first" stage" or "design" stage) and ending at the live stage. The stages can be created by input from a user; a user interface for inputting the integration flow is discussed in detail in this document. Note that a user can create the stages in any order, however, it may be convenient to initially input the default stage and the live stage, and then to insert the additional stages. The input integration flow can be stored for later use, in integration flow storage (not illustrated) which can be remote such as at server 1223 or local such as in memory 1211.

The processor 1205 may be programmed to receive 1237 an instruction to promote the input integration flow. The instruction to promote the integration flow can provide that each stage can be individually selectable and managed individually, for example, to run the stage, to pause the stage, to change the schedule information for the stage, and/or to otherwise manage the stage. An appropriate user interface for integration flow promotion is discussed elsewhere in this document.

The processor 1205 may be programmed to load balance 1239 the input integration flow by allocating the live stage and the additional input stages to one or more execution environments. Also, the processor 1205 may be programmed to run 1240 the input integration flow in the one or more execution environments. The load balancing 1239 and running 1240 of the integration flow are well discussed elsewhere in this document.

As will be understood in this field, besides the functions discussed above, the memory 1211 can include other miscellaneous information in a misc. database, not shown, along with the usual temporary storage and other instructions for other programs not considered herein.

The computer 1201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serve as the main information highway interconnecting other components of the computer, and can be connected via an interface to the computer. A disk controller (not illustrated) can interface disk drives to the system bus. These may be internal or external. The processor 1205, memory 1211, a disk drive and/or removable storage medium are referred to as "computer-readable storage media" and provide non-transitory storage of computer programs and data.

It should be understood that FIG. 12 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

V. Glossary

Terms as used herein are intended to be interpreted first, as understood to one of skill in the art of cloud-based software management; and if not interpretable in the art of cloud-based software management, then as understood to one of skill in the art of computer science and information science; and then if not so interpretable, according to a more general dictionary.

The claims may use the following terms, which are defined to have the following meanings for the purpose of the claims herein. Other definitions may be specified in this document.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof The term "ESB" is used herein to denote "Enterprise Service Bus" which is a type of software typically used at business site.

The term "Platform as a service" or "PaaS" is used herein to denote a category of cloud computing services that provides a computing platform and a solution stack as a service. Along with software as a service (SaaS) and infrastructure as a service (IaaS), it is a service model of cloud computing. In this model, the consumer creates an application or service using tools and/or libraries from the provider. The consumer also controls software deployment and configuration settings. The provider provides the networks, servers, storage, and other services that are required to host the consumer's application.

The term "on-premise applications" is used herein to denote software that is installed and run on computers on the premises (in the building) of the person or organization using the software, rather than at a remote facility, such as at a server farm or cloud somewhere on the internet.

The term "staging" is used herein to denote a process that mimics production as closely as possible and is used for the purpose of testing.

The term "multi-tenancy" (and the similar term "multi-tenant") is used herein to denote an architecture in which a single instance of a software application serves multiple customers or clients.

The term "execution environment" is used herein to denote a server on which the flow can be executed. In terms of webMethods, it is the Integration Server, but it may be different for other ESB vendors.

The term "scheduler" is used herein to denote computer application for enterprise-level job scheduling used for process automation. See, for example, the QUARTZ scheduler from quartz-scheduler dot org.

The term "application or service orchestration" is used herein to denote the process of integrating two or more applications and/or services together to automate a process, or synchronize data in real-time.

The phrase "automatically without manual intervention" in a claim is defined to mean that the particular step occurs after the step is initiated until limitations recited in the step are finished without requiring a user to provide input to a processor.

VI. Implementations and Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for staging in a cloud environment have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for staging in a cloud environment comprising:
    defining, by a processor, a default stage for creating and editing integration flows;
    generating, by the processor, an integration flow defined by (a) stages including (i) a live stage to follow the default stage, (ii) additional stages between the default stage and the live stage, and (b) endpoint definitions for the live stage and each of the additional stages;
    receiving, by the processor, an instruction to promote the integration flow;
    load balancing, in response to the instruction to promote the integration flow, by the processor, the integration flow by allocating each of the live stage and the additional stages to one or more execution environments, wherein the execution environments are multi-tenant aware; and
    running, by the processor, in response to the live stage and the additional stages being allocated, the integration flow in the one or more execution environments,
    wherein the load balancing includes, in response to each of the live stage and the additional stages, by the processor, (i) retrieving a list of available execution environments which are available for execution of the stages, (ii) selecting one or more of the available execution environments on which to execute the stage and updating the list of available execution environments to indicate that the selected one or more execution environments is allocated, and (iii) storing the selected one or more execution environments as specific to the stage;
    wherein a same integration flow which is promoted by the load balancing is a separate instance in which different stages of the live stage, the default stage, and the additional stages are executed in a same location;
    wherein the execution environments and the different stages of the same integration flow executed in the same location depend on which tenant of a plurality of tenants invokes the separate instance of the same integration flow;
    wherein any of the live stage and the additional stages can be run individually, wherein the load balancing is performed separately for each of the live stage and the additional stages that is run, wherein data modified by the live stage is live data different from data modified by the default stage, wherein each stage mimics a same entire production stage.

2. The method of claim 1, further comprising, in response to a request to delete one of the stages: deleting the stage from the integration flow, and releasing the selected one or more execution environments to the list of available execution environments.

3. The method of claim 1, wherein the load balancing is performed automatically without manual intervention based on pre-defined rules and with reference to servers which are physically available for execution of the stages.

4. The method of claim 1, wherein the load balancing is manually controlled by a user.

5. The method of claim 1, wherein the running of the integration flow is performed automatically without manual intervention according to a predefined schedule.

6. The method of claim 1, further comprising revising, in response to user input, the integration flow, and maintaining a revision history of the integration flow.

7. The method of claim 1, wherein the endpoint definitions are associated with each of the live stage and the additional stages.

8. A system for staging in a cloud environment, comprising:
a memory; and
a processor cooperatively operable with the memory, and configured to, based on instructions stored in the memory,
define a default stage for creating and editing integration flows;
generate an integration flow defined by (a) stages including (i) a live stage to follow the default stage, (ii) additional stages between the default stage and the live stage, and (b) endpoint definitions for the live stage and each of the additional stages;
receive an instruction to promote the integration flow;
load balance the integration flow, in response to the instruction to promote the integration flow, by allocating each of the live stage and the additional stages to one or more execution environments, wherein the execution environments are multi-tenant aware; and
run the integration flow, in response to the live stage and the additional stages being allocated, in the one or more execution environments,
wherein the load balancing includes, in response to each of the live stage and the additional stages, (i) retrieving a list of available execution environments which are available for execution of the stages, (ii) selecting one or more of the available execution environments on which to execute the stage and updating the list of available execution environments to indicate that the selected one or more execution environments is allocated, and (iii) storing the selected one or more execution environments as specific to the stage;
wherein a same integration flow which is promoted by the load balancing is a separate instance in which different stages of the live stage, the default stage, and the additional stages are executed in a same location;
wherein the execution environments and the different stages of the same integration flow executed in the same location depend on which tenant of a plurality of tenants invokes the separate instance of the same integration flow;
wherein any of the live stage and the additional stages can be run individually, wherein the load balancing is performed separately for each of the live stage and the additional stages that is run,
wherein data modified by the live stage is live data different from data modified by the default stage, wherein each stage mimics a same entire production stage.

9. The system of claim 8, wherein the processor is further configured, in response to a request to delete one of the stages, to: delete the stage from the integration flow, and release the selected one or more execution environments to the list of available execution environments.

10. The system of claim 8, wherein the processor is further configured to load balance the integration flow automatically without manual intervention based on pre-defined rules.

11. The system of claim 8, wherein the processor is further configured to load balance the integration flow responsive to manual input by a user.

12. The system of claim 8, wherein the processor is further configured to run the integration flow automatically without manual intervention according to a predefined schedule.

13. The system of claim 8, wherein the processor is further configured to revise, in response to user input, the integration flow, and to maintain a revision history of the integration flow.

14. The system of claim 8, wherein the endpoints definitions are associated with each of the live stage and the additional stages.

15. A non-transitory computer readable medium comprising executable instructions for a method for staging in a cloud environment, the instructions being executed to perform:
defining a default stage for creating and editing integration flows;
generating an integration flow defined by (a) stages including (i) a live stage to follow the default stage, (ii) additional stages between the default stage and the live stage, and (b) endpoint definitions for the live stage and each of the additional stages;
receiving an instruction to promote the integration flow;
load balancing, in response to the instruction to promote the integration flow, the integration flow by allocating each of the live stage and the additional stages to one or more execution environments, wherein the execution environments are multi-tenant aware; and
running, in response to the live stage and the additional stages being allocated, the integration flow in the one or more execution environments,
wherein the load balancing includes, in response to each of the live stage and the additional stages, (i) retrieving a list of available execution environments which are available for execution of the stages, (ii) selecting one or more of the available execution environments on which to execute the stage and updating the list of available execution environments to indicate that the selected one or more execution environments is allocated, and (iii) storing the selected one or more execution environments as specific to the stage;
wherein a same integration flow which is promoted by the load balancing is a separate instance in which different stages of the live stage, the default stage, and the additional stages are executed in a same location;
wherein the execution environments and the different stages of the same integration flow executed in the same location depend on which tenant of a plurality of tenants invokes the separate instance of the same integration flow;

wherein any of the live stage and the additional stages can be run individually, wherein the load balancing is performed separately for each of the live stage and the additional stages that is run, wherein data modified by the live stage is live data different from data modified by the default stage, wherein each stage mimics a same entire production stage.

16. The non-transitory computer readable medium of claim 15, further comprising, in response to a request to delete one of the stages: deleting the stage from the integration flow, and releasing the selected one or more execution environments to the list of available execution environments.

17. The non-transitory computer readable medium of claim 15, wherein the load balancing is performed automatically without manual intervention based on pre-defined rules.

18. The non-transitory computer readable medium of claim 15, wherein the running of the integration flow is performed automatically without manual intervention according to a predefined schedule.

19. The non-transitory computer readable medium of claim 15, further comprising revising, in response to user input, the integration flow, and maintaining a revision history of the integration flow.

20. The non-transitory computer readable medium of claim 15, wherein the endpoint definitions are associated with each of the live stage and the additional stages.

* * * * *